United States Patent Office 3,489,798
Patented Jan. 13, 1970

3,489,798
BENZENESULFONYL-UREAS AND PROCESS FOR PREPARING THEM
Helmut Weber, Frankfurt am Main, Walter Aumüller, Kelkheim, Taunus, Rudi Weyer, Frankfurt am Main, Karl Muth, Kelkheim, Taunus, and Erich Haack, Heidelberg, Germany, assignors to Farbwerke Hoechst Aktiengesellschaft vormals Meister Lucius & Bruning, Frankfurt am Main, Germany
No Drawing. Filed May 31, 1966, Ser. No. 553,624
Claims priority, application Germany, July 17, 1965, F 46,641
Int. Cl. C07c 127/16; A61k 27/00
U.S. Cl. 260—553                              15 Claims

ABSTRACT OF THE DISCLOSURE

Benzenesulfonyl urea compounds that are effective as oral antidiabetics and have the formula

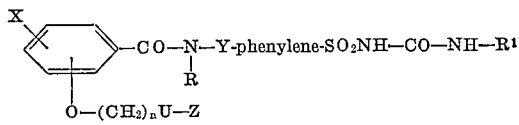

wherein:

R is hydrogen, lower alkyl or lower phenylalkyl;
$R^1$ is
  (a) an alkyl, alkenyl or mercaptoalkyl containing 2 to 8 carbon atoms,
  (b) alkoxyalkyl, alkylmercaptoalkyl or alkylsulfinylalkyl containing 4 to 8 carbon of which at least two are in the alkylene moiety,
  (c) phenyl lower alkyl or phenylcyclopropyl,
  (d) cyclohexyl-lower alkyl, cycloheptylmethyl, cycloheptyl-ethyl or cyclooctylmethyl,
  (e) endoalkylene-cyclohexyl, endoalkylene-cyclohexenyl, endoalkylene-cyclohexylmethyl or endoalkylene-cyclohexenylmethyl containing 1 or 2 endoalkylene-carbon atoms,
  (f) lower alkylcyclohexyl or lower alkoxycyclohexyl,
  (g) cycloalkyl containing 5 to 8 carbon atoms,
  (h) cyclohexenyl or cyclohexenylmethyl,
  (i) a heterocyclic ring containing 4 or 5 carbon atoms and one oxygen or sulfur atom as well as up to two ethylenic double bonds, or
  (k) a heterocyclic ring containing 4 or 5 carbon atoms and one oxygen or sulfur atom, linked to the nitrogen atom by means of a methylene radical and in addition containing up to two ethylenic double bonds;
X is hydrogen, halogen, lower alkyl, lower alkoxy, trifluoromethyl or nitro;
Y is a saturated hydrocarbon chain containing 1 to 4 carbon atoms;
$n$ is 1, 2 or 3;
U is oxygen or sulfur;
Z is a saturated or ethylenically unsaturated, aliphatic or cycloaliphatic hydrocarbon containing up to six carbon atoms, phenyl or benzyl; and physiologically tolerable alkali metal and alkaline earth salts thereof.

The present invention relates to benzenesulfonyl-ureas corresponding to the formula

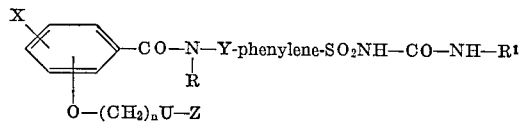

which as such or in the form of their physiologically tolerable salts show hypoglycemic properties and are characterized by a strong and, above all, a long lasting hypoglycemic action. In the formula:

R represents hydrogen, lower alkyl or lower phenylalkyl,
$R^1$ is
  (a) an alkyl, alkenyl or mercaptoalkyl group containing 2 to 8 carbon atoms,
  (b) an alkoxyalkyl, alkylmercaptoalkyl or alkylsulfinylalkyl group containing 4 to 8 carbon atoms of which at least two belong to the alkylene part of the alkoxyalkyl, alkylmercaptoalkyl or alkylsulfinylalkyl group,
  (c) a lower phenylalkyl or phenylcyclopropyl group,
  (d) a lower cyclohexyl-alkyl, cycloheptylmethyl, cycloheptylethyl or cyclooctylmethyl group,
  (e) an endoalkylene-cyclohexyl, endoalkylene-cyclohexenyl, endoalkylene-cyclohexylmethyl or endoalkylene-cyclohexenylmethyl group containing 1 or 2 endoalkylene-carbon atoms,
  (f) a lower alkylcyclohexyl or lower alkoxycyclohexyl group,
  (g) a cycloalkyl group containing 5 to 8 carbon atoms,
  (h) a cyclohexenyl or cyclohexenylmethyl group,
  (i) a heterocyclic ring containing 4 or 5 carbon atoms and one oxygen or sulfur atom as well as up to two ethylenic double bonds or
  (k) a heterocyclic ring containing 4 or 5 carbon atoms and one oxygen or sulfur atom, linked to the nitrogen atom by means of a methylene radical and in addition containing up to two ethylenic double bonds,
X represents hydrogen, halogen, lower alkyl, lower alkoxy, trifluoromethyl or nitro,
Y represents a hydrocarbon chain containing 1 to 4 carbon atoms,
$n$ represents 1, 2 or 3,
U represents oxygen or sulfur,
Z represents a saturated or unsaturated, aliphatic or cycloaliphatic hydrocarbon radical containing up to 6 carbon atoms, a phenyl group or a benzyl group; the group —O—$(CH_2)_n$—U—Z being preferably in 2-position and X being preferably in 4- or 5-position.

In the above and the following definitions "lower alkyl" always stands for an alkyl group containing 1 to 4 carbon atoms in a straight or ramified chain.

According to the above-mentioned definitions R may represent for instance, methyl, ethyl, propyl, isopropyl, butyl, isobutyl, tertiary butyl, benzyl, α- or β-phenylethyl, α-, β- or γ-phenyl-propyl. Compounds in which R stands for methyl or benzyl and particularly those in which R represents hydrogen are preferred.

$R^1$ may represent, for instance, ethyl, propyl, isopropyl, butyl, isobutyl, sec.butyl, straight-chained or ramified amyl (prentyl) hexyl, heptyl or octyl; the radicals containing one ethylenic double bond corresponding to the above-mentioned hydrocarbon radicals, for instance allyl or crotyl, furthermore alkyls containing 2 to 8 carbon atoms and carrying a mercapto group, such, for instance, as β-mercaptoethyl or higher mercapto alkyls. Futhermore, $R^1$ may represent, for instance, γ-methoxy-propyl, δ-methoxy-n-butyl, β-ethoxyethyl, γ-ethoxy-propyl, δ-ethoxybutyl or higher alkyloxy-ethyls, alkyloxy-propyls or alkyloxybutyls as well as the corresponding groups which instead of the oxygen atom contain a sulfur atom or the sulfinyl group. There may likewise be mentioned as $R^1$: benzyl, α-phenyl-ethyl, β-phenyl-ethyl, α-, β- or γ-phenylpropyl or phenylbutyls.

Particularly preferred are compounds which as $R^1$ contain a cycloaliphatic hydrocarbon radical which may be substituted by alkyl or alkoxy or bound by alkylene to the nitrogen atom. As radicals of said type, there are mentioned for example, cyclopentyl, cyclohexyl, cycloheptyl, cyclooctyl, methylcyclohexyl, ethylcyclohexyl, propyl- cyclohexyl, isopropylcyclohexyl, methoxy - cyclohexyl, ethoxy-cyclohexyl, propoxy-cyclohexyl and isopropoxy- cyclohexyl, the alkyl- or alkoxy groups being in 2- or 3-position and, preferably, in 4-position, in cis- as well as in trans-position; cyclohexylmethyl, α- or β-cyclohexyl- ethyl, cyclohexyl-propyls, endomethylene-cyclohexyl (2,2, 1-tricycloheptyl), endoethylene-cyclohexyl (2,2,2-tricyclo- octyl), endomethylene-cyclohexenyl, endoethylene-cyclo- hexenyl, endomethylene-cyclohexylmethyl, endoethylene- cyclohexylmethyl, endomethylene-cyclohexenylmethyl or endoethylene-cyclohexenyl-methyl, α- or β-phenylcyclo- propyl in cis-form as well as in trans-form.

Finally, there are suitable as R¹ heterocyclic rings which contain in addition to 4 to 5 carbon atoms one oxygen or sulfur atom and up to 2 double linkages and which may be linked to the adjacent nitrogen atom by a methyl- ene group. Examples for heterocyclic rings of said kind are

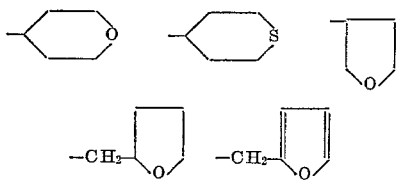

As examples for the bridge member Y there are mentioned:

—CH₂—, —CH₂—CH₂—, —CH(CH₃)—
—CH₂—CH₂—CH₂, —CH(CH₃)—CH₂—
CH₂—CH(CH₃)—, —C(CH₃)₂—
—CH₂—CH₂—CH₂—CH₂—
—CH(CH₃)—CH₂—CH₂—, —CH₂—CH(CH₃)—CH₂—
—CH₂—CH₂—CH(CH₃)—
—CH(CH₃)—CH(CH₃)—, —C(CH₃)₂—CH₂—
—CH₂—C(CH₃)₂—, —CH(C₂H₅)—
—C(CH₃)(C₂H₅)—

The phenylene group designated in the formula with "phenylene" is preferably unsubstituted. It can, however, likewise be mono- or poly-substituted by halogen, lower alkyl or lower alkoxy. It may carry the remaining parts of the molecule in ortho, meta or para position to each other, the para-position being preferred.

The process of the present invention is characterized in that (a) Benzenesulfonyl - isocyanates, benzenesulfonyl-car- bamic acid esters, benzenesulfonyl-thiocarbamic acid esters, benzenesulfonyl-carbamic acid halides or benzene- sulfonyl ureas substituted by the group

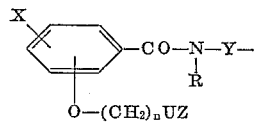

are reacted with R¹-substituted amines or their salts;

(b) Benzenesulfonamides of the formula

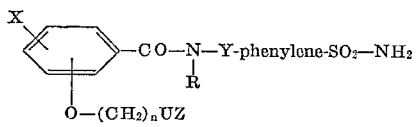

or their salts are reacted with R¹-substituted isocyanates, carbamic acid esters, thiocarbamic acid esters, carbamic acid halides or ureas.

(c) Correspondingly s u b s t i t u t e d benzenesulfonyl- halides are reacted with R¹-substituted ureas, isourea ethers, isothiourea ethers or parabanic acids and the benzenesulfonyl-isourea ethers, benzenesulfonyl-isothiourea ethers or benzenesulfonyl-parabanic acids obtained in this way or according to any other method are hy- drolyzed, (d) In correspondingly substituted benzenesulfonyl- thioureas the sulfur atom is exchanged in known manner for an oxygen atom, (e) Corresponding benzenesulfinyl-ureas or benzene- sulfenyl-ureas are oxidized or (f) In benzenesulfonyl-ureas of the formula HN—Y-phenylene-SO₂—NH—CO—NH—R¹
|
R the radical

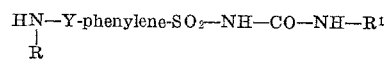

is introduced by acylation, if desired in several stages and the reaction products are treated with alkaline agents, if the formation of salts is desired.

According to the nature of the member

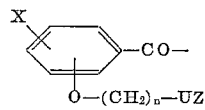

one or the other method mentioned above for the prepa- ration of certain individual compounds corresponding to the general formula may be unsuitable in some cases. Such cases which do not occur very often can easily be recognized by the expert and there will be no difficulties to apply in said cases another one of the methods of syn- thesis described above.

Instead of the benzenesulfonyl-isocyanates there can likewise be used reaction products of benzenesulfonyl- isocyanates with acid amides such as caprolactam or butyrolactam, furthermore with weakly basic amines such as carbazols.

The above-mentioned benzenesulfonyl-carbamic acid esters or the benzenesulfonyl-thiocarbamic acid esters may contain in the alcohol component a low-molecular alkyl group or a phenyl group. The same applies to the R¹-sub- stituted carbamic acid esters or the corresponding mono- thio-carbamic acid esters. A low-molecular or lower alkyl group in the sense of the invention is in all cases an alkyl group containing not more than 4 carbon atoms.

As carbamic acid halides there are suitable, above all, the chlorides.

The benzenesulfonyl-ureas used as starting substances for the process of the invention may be unsubstituted at the side of the urea molecule opposite to the sulfonyl group or may be mono- or disubstituted preferably by lower alkyl groups or aryl groups. Instead of benzenesul- fonyl-ureas substituted in the above-mentioned way there can likewise be used corresponding N-benzenesulfonyl-N'- acyl-ureas (acyl=lower aliphatic acyl such as acetyl, pro- pionyl or butyryl, but likewise benzoyl) and also bis-(ben- zenesulfonyl)-ureas. It is, for instance, possible to treat said bis-(benzenesulfonyl)-ureas or N-benzenesulfonyl- N'-acyl-ureas with amines R¹NH₂ and to heat the salts obtained to elevated temperatures, particularly to tem- peratures above 100° C.

Furthermore, it is possible to start from ureas of the formula R¹—NH—CO—NH₂ or acylated ureas of the formula R¹—NH—CO—NH-acyl, wherein acyl prefer- ably represents a low-molecular aliphatic or aromatic acid radical or the nitro group, or from phenyl-ureas of the formula R¹—NH—CO—NH—C₆H₅ or from diphenyl- ureas of the formula R¹—NH—CO—N(C₆H₅)₂. The phenyl groups can be substituted or linked to each other directly or likewise by means of a bridge member such as —CH₂—, —NH—, —O— or —S—. It is likewise possi- ble to start from N.N'-disubstituted ureas of the formula R¹—NH—CO—NH—R¹ and to react these with correspondingly substituted benzene-sulfonamides.

The sulfur atom in correspondingly substituted benzenesulfonyl-thio-ureas can be replaced by an oxygen atom, for instance, with the aid of oxides or salts of heavy metals or likewise by applying oxidizing agents such as hydrogen peroxide, sodium peroxide or nitrous acid.

Thioureas may likewise be desulfurized by treating them with phosgene or phosphorus pentachloride. Chloroformic acid amidines or chloroformic acid carbodiimides obtained as intermediate products can be converted into the benzenesulfonyl-ureas by suitable processes, such, for instance, as saponification or addition of water.

In the sense of the invention isothiourea-ethers are considered equivalents to thioureas as starting substances for the desulfurization and react like these.

Generally, the methods of carrying out the aforesaid processes may vary within wide limits as regards the reaction conditions, and they may be adapted to each individual case. The reactions may be carried out, for example, by using solvents, at room temperature or at an elevated temperature.

As starting materials there are used on the one hand compounds containing a benzene radical substituted by the group

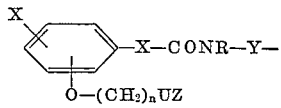

As examples for the component

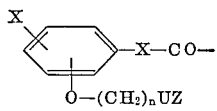

of this formula there are mentioned—without intention to limit them thereto—the following compounds:

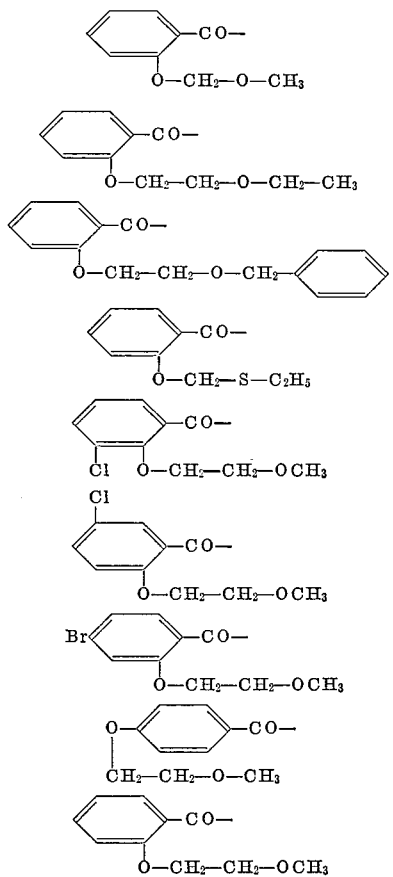

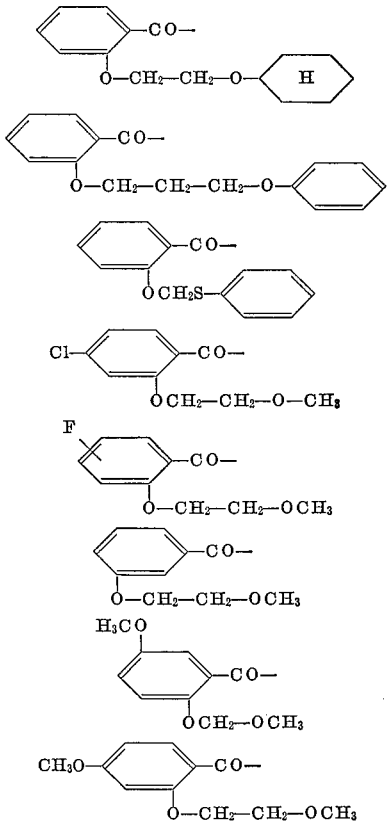

The blood sugar lowering action of the benzenesulfonyl-urea derivatives described above can be ascertained, for example, in rabbits by administering to the animals the products of the invention in doses of 10 milligrams/kilogram of body weight and by determining the blood sugar value according to the known method of Hagedorn-Jensen or by means of an auto-analyzer over a prolonged period.

It has been found, for example, that 10 mg./kg. of N-[4-($\beta$- <2-methoxy-methoxybenzamido>-ethyl)-benzenesulfonyl]-N'-cyclohexyl urea provoke a hypoglycemic effect of 19% after 3 hours which after 24 hours even arrives at 33% and is equal to zero only after a period of 48 hours. By administration of 10 milligrams of N-[4-($\beta$- <2 - $\beta$ - methoxyethoxy-benzamido>-ethyl)-benzenesulfonyl]-N'-(4-methylcychlohexyl)-urea the blood sugar level is reduced after 3 hours of 31% and after a period of 24 hours the reduction still amounts to 20%, whereas the known N-(4-methyl-benzenesulfonyl)-N'-butyl-urea in a dose of less than 25 mg./kg. does not provoke a lowering of the blood sugar level in rabbits.

The high efficiency of the above-described benzenesulfonylureas becomes particularly obvious if the dose is further reduced. If the N-[4-$\beta$-<2-methoxymethoxybenzamido> - ethyl) - benzene - sulfonyl]-N'-(4-methylcyclohexyl)-urea is administered to the rabbit in a dose of 0.05 mg./kg. a distinct lowering of the blood sugar level is still observed.

The compounds of the present invention are preferably used for the production of pharmaceutical preparations for oral administration, which preparations exhibit hypoglycemic properties and can, therefore, be used in the treatment of diabetes mellitus. They can be used as such or in the form of their physiologically tolerable salts or in the presence of substances causing salt formation. For the salt formation there may be used: alkaline agents such as alkali metal hydroxides, alkaline earth metal hydroxides, alkali metal carbonates or alkaline earth metal carbonates, alkali metal bicarbontes or alkaline earth metal bicarbonates.

The pharmaceutical preparations are preferably made up in the form of tablets containing in addition to the products of the present invention the usual adjuvants and carrier substances such, for example as talc, starch, lactose, tragacanth or magnesium stearate.

A preparation containing one of the benzenesulfonyl-ureas of the present invention as active substance, for example a tablet or a powder, with or without the aforesaid additives is preferably formed into a suitable unit dosage form. The dose chosen should take into consideration the activity of the benzenesulfonyl-urea used and the desired effect. Advantageously the dosage per unit amounts to about 0.5 to 100 milligrams, preferably 2 to 10 milligrams, but considerably higher or lower dosage units can also be used which, if desired, are divided or multiplied prior to administration.

The following examples serve to illustrate the invention but they are not intended to limit it thereto:

EXAMPLE 1

N-[4-β-<2-methoxy-ethoxy-benzamido>-ethyl)-benzenesulfonyl]-N'-cyclohexyl-urea (a) 2.6 grams of N-[4-(β-<2-methoxy-ethoxy-benzamido> - ethyl) - benzenesulfonyl] - N'-cyclohexyl-thiourea (prepared from N-(4-β-<2-methoxy-ethoxy-benzamido> - ethyl) - benzenesulfonamide and cyclohexyl-mustard oil, melting point 116–118° C.) are dissolved in about 20 milliliters of 2 N-sodium hydroxide solution. 5 grams of H₂O₂ of 35% strength are added whereby strong heating is caused. Upon standing for some time the solution is cooled and acidified by means of dilute acetic acid. The precipitate obtained, i.e. the N-[4-(β-<2-methoxy - ethoxy - benzamido>-ethyl-benzenesulfonyl]-N'-cyclohexyl-urea is filtered off with suction and recrystallized from methanol. Melting point 160–162° C.

(b) 2.6 grams of N-[4-(β-<2-methoxy-ethoxy-benzamido> - ethyl) - benzenesulfonyl] - N'-cyclohexyl-thiourea are dissolved in 30 milliliters of methanol. After addition of CH₃I in a slightly excessive amount the solution is heated for 45 minutes on the steam bath with reflux. After elimination by distillation of methanol and excessive methyl-iodide there remains an oily residue of N - [4 - (β - <2 - methoxy - ethoxy-benzamido>-ethyl)-benzenesulfonyl]-N'-cyclohexyl-isothio-urea methyl ether which is dissolved in 5 milliliters of dioxane and to which 10 milliliters of 2 N-sodium hydroxide solution are added. After having been heated for 1 hour on the steam bath, the solution is poured into water and acidified. After having been filtered with suction and recrystallized from methanol the precipitate of N-[4-(β-<2-methoxy-ethoxy-benzamido> - ethyl) - benzenesulfonyl] - N'-cyclohexyl-urea obtained melts at 160–162° C.

(c) 2.6 grams of N-[4-(β-<2-methoxy-ethoxy-benzamido] - ethyl) - benzenesulfonyl] - N'-cyclohexyl-thiourea are dissolved in 50 milliliters of methanol. 1.1 gram of HgO and a small amount of K₂CO₃ are added and the whole is heated with stirring for 5 hours and 30 minutes to 45° C. After elimination by filtration of the HgS formed the solution is concentrated under reduced pressure. An oily residue of N-[4-(β-<2-methoxy-ethoxy-benzamido> - ethyl) - benzenesulfonyl] - N'-cyclohexyl-isourea-methyl-ether is obtained which is dissolved in about 5 milliliters of dioxane. About 10 milliliters of 2 N-sodium hydroxide solution are added and the substance is heated for 1 hour on the steam bath. It is then poured into water and acidified. The precipitate of N-[4-(β-<2-methoxy - ethoxy - benzamido>-ethyl)-benzenesulfonyl]-N'-cyclohexyl-urea is filtered off with suction and recrystallized from dilute methanol. Melting point 160–162° C.

EXAMPLE 2

N - [4 - (β - <2 - methoxy-methoxy-benzamido>-ethyl)-benzenesulfonyl] - N' - (4 - methylcyclohexyl) - urea (trans)

9.1 grams of 4-(β-<2-methoxy-methoxy-benzamido>-ethyl)-benzene-sulfonamide (melting point 169–170° C.) are dissolved in 12.5 milliliters of 2 N-sodium hydroxide solution and 30 milliliters of acetone and while stirring at 0–5° C. 3.6 grams of trans-4-methylcyclohexyl-isocyanate are dropwise added. Stirring is continued for a further 3 hours, water and methanol are added and any undissolved matter is filtered off, the filtrate is acidified with dilute acetic acid. After recrystallization from methanol the N - [4 - (β - <2 - methoxymethoxybenzamido>-ethyl)-benzene-sulfonyl]-N'-(4-methyl-cyclohexyl)-urea (trans) obtained in crystalline form melts at 162–163° C. In an analogous manner there are obtained:

N - [4 - (β - <2 - methoxymethoxy-benzamido>-ethyl)-benzenesulfonyl] - N' - cyclohexyl urea, melting point 152–154° C. (from methanol); from 4-(β-<4-methoxymethoxy-benzamido>-ethyl)-benzenesulfonamide, (melting point 196–197° C.):

N - [4 - (β - <4 - methoxymethoxy-benzamido>-ethyl)-benzenesulfonyl] - N' - cyclohexyl-urea, melting point: 175–176° C. (from methanol/dimethylformamide) and N - [4 - (β - <4 - methoxymethoxy-benzamido>-ethyl)-benzenesulfonyl]-N'-(4-methylcyclohexyl) urea (trans), melting point 180–181° C. (from methanol/dimethylformamide;

From 1-(β-<3-β-methoxyethoxy-benzamido>-ethyl)-benzenesulfonamide (melting point 134–136° C.):

N - [4 - β - <3 - β - methoxyethoxy-benzamido>-ethyl)-benzenesulfonyl]-N'-cyclohexyl-urea, melting point 132–133° C. (from methanol) and N-[4-(β-<3-β-methoxyethoxy-benzamido>-ethyl)-benzenesulfonyl]-N'-(4-methylcyclohexyl)-urea (trans), melting point 157–159° C. (from methanol);

From 4-(β-<4-β-methoxyethoxy-benzamido>-ethyl)-benzenesulfonamide (melting point 212–214° C.):

N-[4-(β-<4-β-methoxyethoxy-benzamido>-ethyl)-benzenesulfonal]-N'-cyclohexyl-urea, melting point: 200–201° C. (from methanol/dimethylformamide), N-[4-(β-<4-β-methoxyethoxy-benzamido>-ethyl)-benzenesulfonyl]-N'-butyl-urea, melting point 197–198° C. (from methanol/dimethylformamide) and N-[4-(β-<4-β-methoxyethoxy-benzamido>-ethyl)-benzenesulfonyl]-N'-(4-(methyl-cyclohexyl)-urea (trans), melting point 208–209° C. (from methanol/dimethylformamide);

From 4-(β-<2-γ-phenoxypropoxy-benzamido>-ethyl)-benzenesulfonamide (melting point 168–170° C.):

N-[4-(β-<2-γ-phenoxypropoxy-benzamido>-ethyl)-benzenesulfonyl]-N'-cyclohexyl-urea, melting point 148–149° C. (from methanol), N'-[4-(β-<2-γ-phenoxypropoxy-benzamido>-ethyl)-benzenesulfonyl]-N'-butyl-urea, melting point 142–144° C. (from methanol/dimethyl-formamide) and N-[4-(β-<2-γ-phenoxypropoxy-benzamido>-ethyl-benzenesulfonyl]-N'-(4-methylcyclohexyl)-urea (trans), melting point 169–170° C. (from methanol);

From 4-(β-<2-phenylmercaptomethoxy-benzamido>-ethyl)-benzenesulfonamide (melting point 152–153° C.):

N-[4-(β-<2-phenylmercaptomethoxy-benzamido>-ethyl)-benzenesulfonyl]-N'-cyclohexyl-urea, melting point 136–138° C. (from methanol);

From 4-(β-<2-β-methoxyethoxy-5-methyl-benzamido>-ethyl)-benzene-sulfonamide (melting point 156–158° C.):

N-[4-(β-<2-β-methoxyethoxy-5-methyl-benzamido>-ethyl)-benzene-sulfonyl]-N'-cyclohexyl-urea, melting point 161–163° C. (from methanol) and N-[4-(β-<2-β-methoxyethoxy-5-methyl-benzamido>-ethyl)-benzenesulfonyl]-N'-(4-methylcyclohexyl)-urea (trans), melting point 157–158° C. (from methanol);

From 4-(β-<2-β-methoxyethoxy-5-chloro-benzamido>-benzene-sulfonamide, (melting point 161–162° C.):
N-[4-(β-<2-β-methoxyethoxy-5-chloro-benzamido>-ethyl)-benzenesulfonyl]-N'-cyclohexyl-urea, melting point 151–153° C. (from methanol) and
N-[4-(β-<2-β-methoxyethoxy-5-chloro-benzamido>-ethyl)-benzene-sulfonyl]-N'-(4-methylcyclohexyl)-urea (trans), melting point 145–147° C. (from methanol);

From 4-(β-<2-β-methoxyethoxy-5-methoxy-benzamido>-ethyl)-benzene-sulfonamide (melting point 177–178° C.):
N-[4-(β-<2-β-methoxy-ethoxy-5-methoxy-benzamido>-ethyl)-benzenesulfonyl]-N'-cyclohexyl-urea, melting point 140–142° C. (from methanol) and
N-[4-(β-<2-β-methoxy-ethoxy-5-methoxy-benzamido>-ethyl)-benzenesulfonyl]-N'-(4-methylcyclohexyl)-urea (trans), melting point 163–165° C. (from methanol);

In an analogous manner there are obtained:

From 4-(2-methoxy-methoxy-benzamido-methyl)-benzenesulfonamide (melting point 176–178° C.):
N-[4-(2-methoxy-methoxy-benzamidomethyl)-benzenesulfonyl]-N'-cyclohexyl-urea, melting point 191–193° C.),
From 4-(β-<2-methoxy-methoxy-benzamido>-ethyl)-benzenesulfonamide (melting point 169–170° C.):
N-[4-(3-<2-methoxy-methoxy-benzamido>-ethyl)-benzenesulfonyl]-N'-cyclohexyl-urea, melting point 151–153° C. (from methanol);
From 4-(β-<4-β-ethoxy-ethoxy-benzamido>-ethyl)-benzenesulfonamide (melting point 200–202° C.):
N-[4-(β-<4-β-ethoxy-ethoxy-benzamido>-ethyl)-benzenesulfonyl]-N'-(4-methylcyclohexyl)-urea (trans), melting point 182–184° C. (from methanol);
From 4-(β-<2-β-ethoxy-ethoxy-5-methyl-benzamido>-ethyl)-benzenesulfonamide (melting point 132–134° C.):
N-[4-(β-<2-β-ethoxy-ethoxy-5-methylbenzamido>-ethyl)-benzenesulfonyl]-N'-cyclohexyl-urea, melting point 121–123° C. (from methanol) and
N-[4-(β-<2-β-ethoxy-ethoxy-5-methylbenzamido>-ethyl-benzenesulfonyl]-N-(4-methylcyclohexyl)-urea (trans), melting point 118–119° C. (from methanol);
From 4-(β-<2-methoxy-methoxy-5-methyl-benzamido>-ethyl)-benzene-sulfonamide (melting point 225–228° C.):
N-[4-(β-<2-methoxy-methoxy-5-methyl-benzamido>-ethyl)-benzene-sulfonyl]-N'-cyclohexyl-urea, melting point 224–226° C. (from methanol/dimethyl-formamide) and
N-[4-(β-<2-methoxy-methoxy-5-methyl-benzamido>-ethyl)-benzenesulfonyl]-N'-(4-methyl-cyclohexyl)-urea (trans), melting point 199–201° C. (from methanol/dimethyl-formamide);
From 4-(β-<2-β-methoxy-ethoxy-5-fluoro-benzamido>-ethyl)-benzene-sulfonamide (melting point 154–155° C.):
N-[4-(β-<2-β-methoxy-ethoxy-5-fluoro-benzamido>-ethyl)-benzene-sulfonyl]-N'-cyclohexyl-urea, melting point 132–134° C. (from methanol),
N-[4-(β-<2-β-methoxy-ethoxy-5-fluoro-benzamido>-ethyl)-benzene-sulfonyl]-N'-(4-methyl-cyclohexyl)-urea (trans), melting point 161–163° C. (from methanol) and
N-[4-(β-<2-β-methoxy-ethoxy-5-fluoro-benzamido>-ethyl)-benzenesulfonyl]-N'-(4-ethyl-cyclohexyl)-urea (trans), melting point 156–158° C. (from methanol).

EXAMPLE 3

N-[4-(β-<2-β-methoxy-ethoxy-benzamido>-ethyl)-benzenesulfonyl]-N'-cyclohexyl-urea 8.7 grams of N - [4 - (β - <2 - β - methoxy - ethoxy-benzamido> - ethyl) - benzene - sulfonyl] - methyl-urethane (melting point 123–125° C.) are suspended in 90 milliliters of xylene and 2 grams of cyclohexylamine are added at 80° C. The suspension is heated to 140–150° C. and the methanol formed in the course of the reaction is distilled off. After about 30 minutes the suspension is allowed to cool, the reaction product is filtered off with suction and washed with methanol and ether. The crude N - [4 - (β - <2 - β - methoxy - ethoxy-benzamido> - ethyl) - benzenesulfonyl] - N' - cyclohexyl-urea after recrystallization from methanol melts at 160 – 162° C. In an analogous manner there is obtained N - [4 - (β - <2 - β - methoxy - ethoxy - benzamido> - ethyl) - benzenesulfonyl] - N' - (4 - methylcyclohexyl)-urea (trans) of a melting point of 153–155° C. (from methanol).

EXAMPLE 4

N-[4-(β-<2-methoxy-ethoxy-benzamido>-ethyl)-benzenesulfonyl]-N'-cyclohexyl-urea 13 grams of N - [4 - (β - <2 - methoxy - ethoxy-benzamido> - ethyl) - benzenesulfonyl] - urea (prepared by starting from the corresponding sulfonamide and reaction with potassium cyanate, melting point 84° C.) are successively diluted with 350 milliliters of toluene, 2.15 grams of glacial acetic acid and 3.7 grams of cyclohexylamine and then stirred for 3 hours at 120° C. After concentration under reduced pressure the residue is treated with ammonia of 1% strength, precipitated and crystallized from methanol. Melting point 160–162° C.

We claim:
1. A compound of the formula

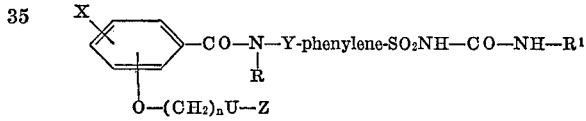

wherein R is hydrogen, lower alkyl or lower phenylalkyl; R¹ is alkyl or alkenyl of 2 to 8 carbon atoms, alkyl-mercapto-alkylene of 4 to 8 carbon atoms of which at least two are in the alkylene moiety, phenyl-lower alkyl, cyclohexenyl-lower alkyl, cyclohexyl, cyclohexenylmethyl, lower alkylcyclohexyl or cycloalkyl of 5 to 8 carbon atoms; X is hydrogen, halogen, lower alkyl, lower alkoxy, trifluoromethyl or nitro; Y is a saturated hydrocarbon chain containing 1 to 4 carbon atoms; n is 1, 2 or 3; U is oxygen or sulfur; Z is a saturated or ethylenically unsaturated, aliphatic or cycloaliphatic hydrocarbon containing up to six carbon atoms, phenyl or benzyl; or a physiologically tolerable alkali metal and alkaline earth salt thereof.

2. Compound of the formula

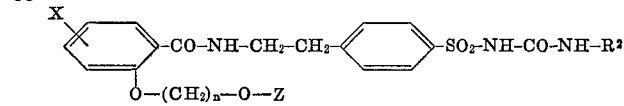

wherein X, n and Z have the meanings given above and R² is cyclohexyl or lower alkyl-cyclohexyl.

3. N - [4 - β<2-methoxy-ethoxy-benzamido>-ethyl)-benzenesulfonyl]-N'-cyclohexyl-urea and physiologically tolerable alkali metal and alkaline earth salts thereof.

4. N - [4 - (β - <2-methoxy-methoxy-benzamido>-ethyl)-benzenesulfonyl] - N'-(4-methyl-cyclohexyl)-urea (trans) and physiologically tolerable alkali metal and alkaline earth salts thereof.

5. N - [4 - (β - <2-methoxy-methoxy-benzamido>-ethyl)-benzenesulfonyl]-N'-cyclohexyl-urea and physiologically tolerable alkali metal and alkaline earth salts thereof.

6. N - [4 - (β - <2-β-methoxy-ethoxy-5-methyl-benzamido> - ethyl) - benzenesulfonyl]-N'-cyclohexyl-urea and physiologically tolerable alkali metal and alkaline earth salts thereof.

7. N - [4 - (β - <2-β-methoxy-ethoxy-5-chloro-benzamido>-ethyl)-benzenesulfonyl]-N'-cyclohexyl-urea and physiologically tolerable alkali metal and alkaline earth salts thereof.

8. N - [4 - (β - <2-β-methoxy-ethoxy-5-chloro-benzamido> - ethyl) - benzenesulfonyl]-N'-(4-methylcyclohexyl)-urea and physiologically tolerable alkali metal and alkaline earth salts thereof.

9. N - [4 - (β - <2 - β-methoxyethoxy-5-methoxybenzamido> - ethyl) - benzenesulfonyl]-N'-(4-methylcyclohexyl)-urea and physiologically tolerable alkali metal and alkaline earth salts thereof.

10. N - [4 - (β - <2 - β-methoxy-ethoxy-benzamido>-ethyl) - benzenesulfonyl] - N' - (4-methyl-cyclohexyl)-urea (trans) and physiologically tolerable alkali metal and alkaline earth salts thereof.

11. N - [4 - (β - <2-methoxy-methoxy-5-methyl-benzamido> - ethyl) - benzenesulfonyl]-N'-cyclohexyl-urea and physiologically tolerable alkali metal and alkaline earth salts thereof.

12. N - [4 - (β - <2-methoxy-methoxy-5-methyl-benzamido> - ethyl) - benzenesulfonyl]-N'-(4-methyl-cyclohexyl)-urea (trans) and physiologically tolerable alkali metal and alkaline earth salts thereof.

13. N - [4 - β - <2 - β - methoxy-ethoxy-5-fluorbenzamido> - ethyl) - benzenesulfonyl]-N'-cyclohexyl-urea and physiologically tolerable alkali metal and alkaline earth salts thereof.

14. N - [4 - (β - <2-β-methoxy-ethoxy-5-fluorbenzamido> - ethyl) - benzenesulfonyl]-N'-(4-methyl-cyclohexyl)-urea (trans) and physiologically tolerable alkali metal and alkaline earth salts thereof.

15. N - [4 - (β - <2-β-methoxy-ethoxy-5-fluorbenzamido> - ethyl) - benzenesulfonyl - N' - (4 - ethyl-cyclohexyl)-urea (trans) and physiologically tolerable alkali metal and alkaline earth salts thereof.

References Cited

UNITED STATES PATENTS 3,202,680  8/1965  Korger et al. _____ 260—347.2

OTHER REFERENCES

Momose et al., J. Pharm. Soc. Japan, vol. 81, pp. 1045 to 1047 (1961).

Ruschig et al., Arzn. Forsch. vol. 8, pp. 448 to 454 (1958).

German printed application (Auslegeschrift) No. 1,185,180, 11 pages specification, printed Jan. 14, 1965.

German printed application (Auslegeschrift) No. 1,244,174, 7 pages specification, printed July 13, 1967.

JOHN D. RANDOLPH, Primary Examiner

U.S. Cl. X.R.

260—327, 345.1, 347.2, 453, 470, 543, 545, 552, 999; 424—321